US008967136B2

(12) United States Patent
Lee (10) Patent No.: US 8,967,136 B2
(45) Date of Patent: Mar. 3, 2015

(54) SOLAR COLLECTOR SYSTEM (76) Inventor: Jeffrey Lee, Durham, NC (US)

(*) Notice: Subject to any disclaimer, the term of this patent is extended or adjusted under 35 U.S.C. 154(b) by 613 days.

(21) Appl. No.: 12/904,714

(22) Filed: Oct. 14, 2010

(65) Prior Publication Data

US 2011/0114081 A1 May 19, 2011

Related U.S. Application Data (60) Provisional application No. 61/251,568, filed on Oct. 14, 2009.

(51) Int. Cl.
*F24J 2/30* (2006.01)
*F24J 2/32* (2006.01)
*F24J 2/05* (2006.01)
*F28D 15/02* (2006.01)

(52) U.S. Cl.
CPC .. *F24J 2/32* (2013.01); *F24J 2/055* (2013.01); *F24J 2/30* (2013.01); *F28D 15/0266* (2013.01); *F28D 15/0275* (2013.01); *Y02E 10/44* (2013.01)
USPC .......................................... 126/643; 126/645

(58) Field of Classification Search
CPC ...................................................... Y02E 10/44
USPC .......................................... 126/643, 654, 645
See application file for complete search history.

(56) References Cited

U.S. PATENT DOCUMENTS

| 4,018,215 | A | | 4/1977 | Pei |
| 4,299,203 | A | * | 11/1981 | Skopp ........................... 126/638 |
| 4,362,025 | A | | 12/1982 | Theakston |
| 4,474,170 | A | | 10/1984 | McConnell et al. |

(Continued)

FOREIGN PATENT DOCUMENTS

| CN | 201273734 Y | 7/2009 |
| CN | 201306790 Y | 9/2009 |

(Continued)

OTHER PUBLICATIONS

Lee, Jeffrey, International Application No. PCT/US2010/052687, International Preliminary Report on Patentability and Written Opinion, dated Apr. 26, 2012.

(Continued)

*Primary Examiner* — Kenneth Rinehart
*Assistant Examiner* — Gajanan M Prabhu
(74) *Attorney, Agent, or Firm* — Michael G. Johnston; Moore & Van Allen PLLC (57) ABSTRACT

A solar energy collecting system comprises a manifold defining a closed fluid passage between a condensation point and a heating point. The manifold includes a plurality of heat exchange members configured to be in heat exchange relationship with the fluid passage at the heating point, and a heat sink at the condensation point. A plurality of solar energy collector members extend from and operably connect to the heat exchange members of the manifold. The solar energy collector members collect solar energy and transform it into heat energy. Heat energy is transferred from the solar energy collector members to the heat exchange members and to a fluid in the passage in the manifold at the heating point so as to heat the fluid into a vapor. The fluid is circulated in heat exchange relationship to the condensation point where heat energy is transferred to the heat sink so as to cool the fluid to a liquid. The fluid repeatedly cycles between a vaporized state at the heat exchange members and a liquefied state at the condensation point.

20 Claims, 10 Drawing Sheets

(56) References Cited

U.S. PATENT DOCUMENTS

| | | | |
|---|---|---|---|
| 4,554,908 A | | 11/1985 | Hanlet et al. |
| 4,619,243 A | * | 10/1986 | Vironneau et al. ............ 126/635 |
| 4,686,961 A | | 8/1987 | Garrison |
| 4,745,749 A | | 5/1988 | Benson |
| 4,785,633 A | | 11/1988 | Meijer et al. |
| 5,809,784 A | | 9/1998 | Kreuter |
| 6,064,572 A | * | 5/2000 | Remsburg .................... 361/700 |
| 6,668,555 B1 | | 12/2003 | Moriarty |
| 2002/0096884 A1 | | 7/2002 | Budliger |
| 2006/0011193 A1 | | 1/2006 | Rong |
| 2007/0101989 A1 | * | 5/2007 | Strathman .................... 126/636 |
| 2008/0250788 A1 | * | 10/2008 | Nuel et al. ................. 60/641.14 |
| 2008/0289334 A1 | | 11/2008 | Orosz et al. |

FOREIGN PATENT DOCUMENTS

| | | | |
|---|---|---|---|
| CN | 101608841 A | 12/2009 | |
| DE | WO2009/047528 A1 * | 4/2009 | ................ F24J 2/05 |
| EP | 2131039 A1 | 12/2009 | |
| JP | 56087742 A | 7/1981 | |
| WO | 9118252 | 11/1991 | |
| WO | 2009047528 A1 | 4/2009 | |

OTHER PUBLICATIONS

Lee, Jeffrey, International Application No. PCT/US2010/052687, International Search Report and Written Opinion, dated Apr. 1, 2011.

Solar Power Rangers, Notre Dame, http://www.nd.edu/~me463d18/Files/General/Documentation/Operation.pdf, 4 pages.

Solar Thermal Principles and Description, sustaininglogic: envrionment & ecological information and resources, http://www.sustaininglogic.com/solar_thermal.html, 8 pages.

Efimov, Alex, Stage 1 Technology Market Evaluation for CERN Evacuated Flat Solar Collector, Science and Technologies Facilities Council, Jul. 2007, 16 pages.

Der Minassians, Artin, Stirling Engines for Low-Temperature Solar-Thermal-Electric Power Generation, Electrical Engineering and Computer Sciences: University of California at Berkeley, Dec. 20, 2007, http://www.eecs.berkeley.edu/Pubs/TechRpts/2007/EECS-2007-172.html, 8 pages.

Diver, R.B., et al., Trends in Dish-Stirling Solar Receiver Designs, IEEE, pp. 303-310.

Mahjouri, F., Vacuum Tube Liquid-Vapor (Heat-Pipe) Collectors, Thermo Technologies, http://www.thermomax.com/Downloads/Vacuum%20Tube%20Paper.pdf, 6 pages.

xkcd—evacuated solar tubes and stirling power generation, http://echochamber.me/viewtopic..php?f=18&t=28925, 10 pages.

Yamaguchi, H., et al., Solar energy powered Rankine cycle using supercritical CO2, Applied Thermal Engineering, Dec. 2006, vol. 26, issues 17-18, pp. 2345-2354.

Barber, Robert E., Current costs of solar powered organic Rankine cycle engines, Solar Energy, 1978, vol. 20, No. 1, http://adsabs.harvard.edu/abs/1978SoEn...20....1B, 1 page.

Lee, Jeffrey, Chinese Application No. 201080055642.1, Office Action, Aug. 5, 2013.

Lee, Jeffrey, Chinese Application No. 201080055642.1, Office Action, Jul. 3, 2014.

* cited by examiner

SOLAR COLLECTOR SYSTEM

CROSS-REFERENCES

This application is related to U.S. provisional application No. 61/251,568, filed on Oct. 14, 2009, entitled "SOLAR COLLECTOR SYSTEM", naming Jeffrey Lee as the inventor. The contents of the provisional application are incorporated herein by reference in their entirety, and the benefit of the filing date of the provisional application is hereby claimed for all purposes that are legally served by such claim for the benefit of the filing date.

BACKGROUND

This invention relates generally to a solar energy collector system, and more particularly to a system and method for collecting solar radiant energy for converting to heat energy for a practical use.

Solar energy collector systems typically comprise a plurality of vacuum jacketed tubular collector elements. Each tubular collector element is sealed at its ends, contains a volatile fluid therein, and is in contact with a solar absorber. The solar absorber converts solar radiant energy to heat energy. The solar absorber transfers the heat energy to the tubular collector elements, which causes fluid in the tubular collector elements to vaporize. A pressure difference between the two ends of the tubular collector elements drives the vapor towards a cooler condenser portion of the collector element. The condenser portion is in contact with a heat sink. In the condenser portion of the collector element, heat is conducted from the vapor of the fluid inside the collector element to the heat sink outside of the collector element. The lower temperature of the vapor due to conduction of the heat from the vapor to the heat sink results in condensation of the fluid in the collector element. The condensed fluid then flows downward from the condenser portion of the collector element wherein solar energy is again absorbed to evaporate the fluid and continue the cycle.

In one application, the tubular collector elements are operably connected in a manifold, which serves to distribute and collect a working fluid, functioning as the heat sink. The working fluid is circulated for heating around the condenser portions of the tubular collector elements for removal of thermal energy absorbed by the collector elements. The tubular collector elements transfer the absorbed solar energy to the working fluid for storing the collected thermal energy, or for transferring the energy to a location where it can be put to practical use.

Developmental efforts relating to evacuated tubular collector elements has been directed to improving the efficiency of removal of the absorbed thermal energy. For the foregoing reasons, there is a need for an improved system and method for the removal of the thermal energy absorbed by evacuated tubular collector elements.

SUMMARY

A solar energy collecting system is provided, comprising a manifold defining a closed fluid passage between a condensation point and a heating point. The manifold includes a plurality of heat exchange members configured to be in heat exchange relationship with the fluid passage at the heating point, and a heat sink at the condensation point. A solar energy collecting device includes a plurality of solar energy collector members extending from and operably connected to the heat exchange members of the manifold. The plurality of solar energy collector members are adapted to collect solar energy and transform said solar energy into heat energy. Heat energy is transferred from the solar energy collector members to the heat exchange members and to a fluid in the passage in the manifold at the heating point so as to heat the fluid into a vapor. The fluid is circulated in heat exchange relationship to the condensation point where heat energy is transferred to the heat sink so as to cool the fluid to a liquid. The fluid repeatedly cycles between a vaporized state at the heat exchange members and a liquefied state at the condensation point of the fluid passage.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

Figure 1:
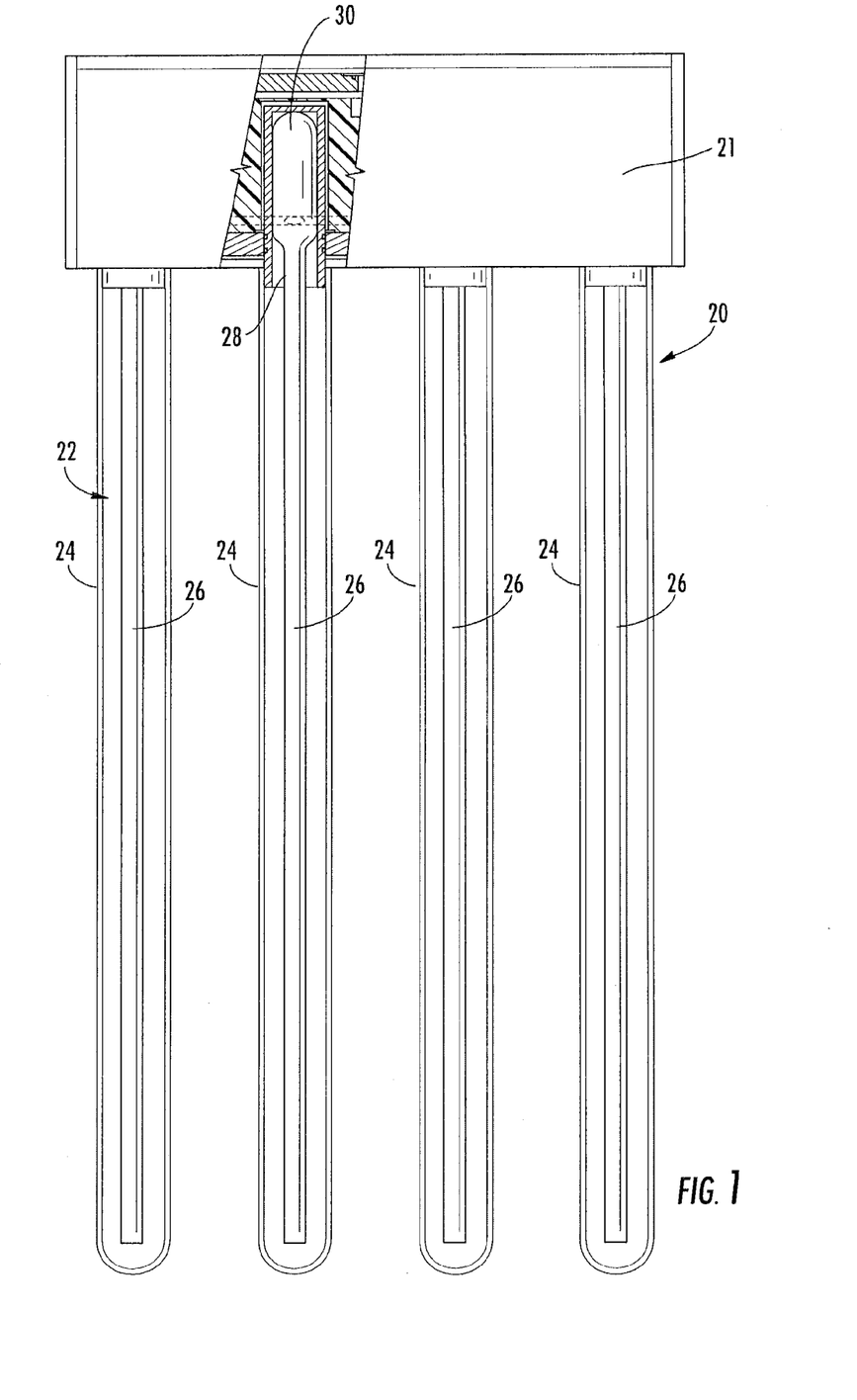
FIG. 1 is an elevation view of an embodiment of a solar energy collector system.

Referring now to the drawings, wherein like reference numerals designate corresponding or similar elements throughout the several views, an embodiment of a system for collecting and converting solar energy into heat energy is shown in FIG. 1 and generally designated at 20. The solar collector 20 comprises a plurality of tubular solar energy collector members 22 operably and detachably connected in parallel and extending from the bottom of an insulated, heat exchange housing 21. In the embodiment depicted, only four tubular solar energy collector members 22 are shown for illustrative purposes only. It is understood that a large array of spaced collector members 22 in parallel may be used, as is known in the art.

The tubular solar energy collector members 22 may comprise conventional glass evacuated tube heat pipe solar collectors, including an outer glass evacuated tube 24 and a closed heat transfer pipe 26 embedded within the glass evacuated tube 24. The heat transfer pipe 26, or heat pipe, may be embodied as a copper pipe, including a stem 28 having a bulb 30 extending from one end of the glass tube 24. The collector members 22 absorb solar radiant energy and transfer the absorbed energy to a working fluid in the heat pipe 26.

As shown in FIG. 1 and described more fully below, the upper end of each heat pipe 26, including the bulb 30, is inserted into the insulated housing 21. In this arrangement, the heat pipe 26 communicates in a heat exchange relationship with the housing 21 for transferring the heat energy from the heat pipe 26 to a thermal transfer fluid circulating in the housing 21. In operation, the energy in the form of the working fluid vapor condenses in the pipe bulb 30 for transferring heat energy to the pipe bulb 30. The heat from the pipe bulb 30 is then transferred in the housing 21 for heating the thermal transfer fluid. While tubular solar energy collector members 22 are depicted, it is understood that any suitable solar energy collecting device having a solar energy collecting surface may be mounted to the heat exchange housing 21 for collecting and transforming solar energy into heat energy to increase the temperature of the thermal transfer fluid in the heat exchange housing 21.

Figure 2:
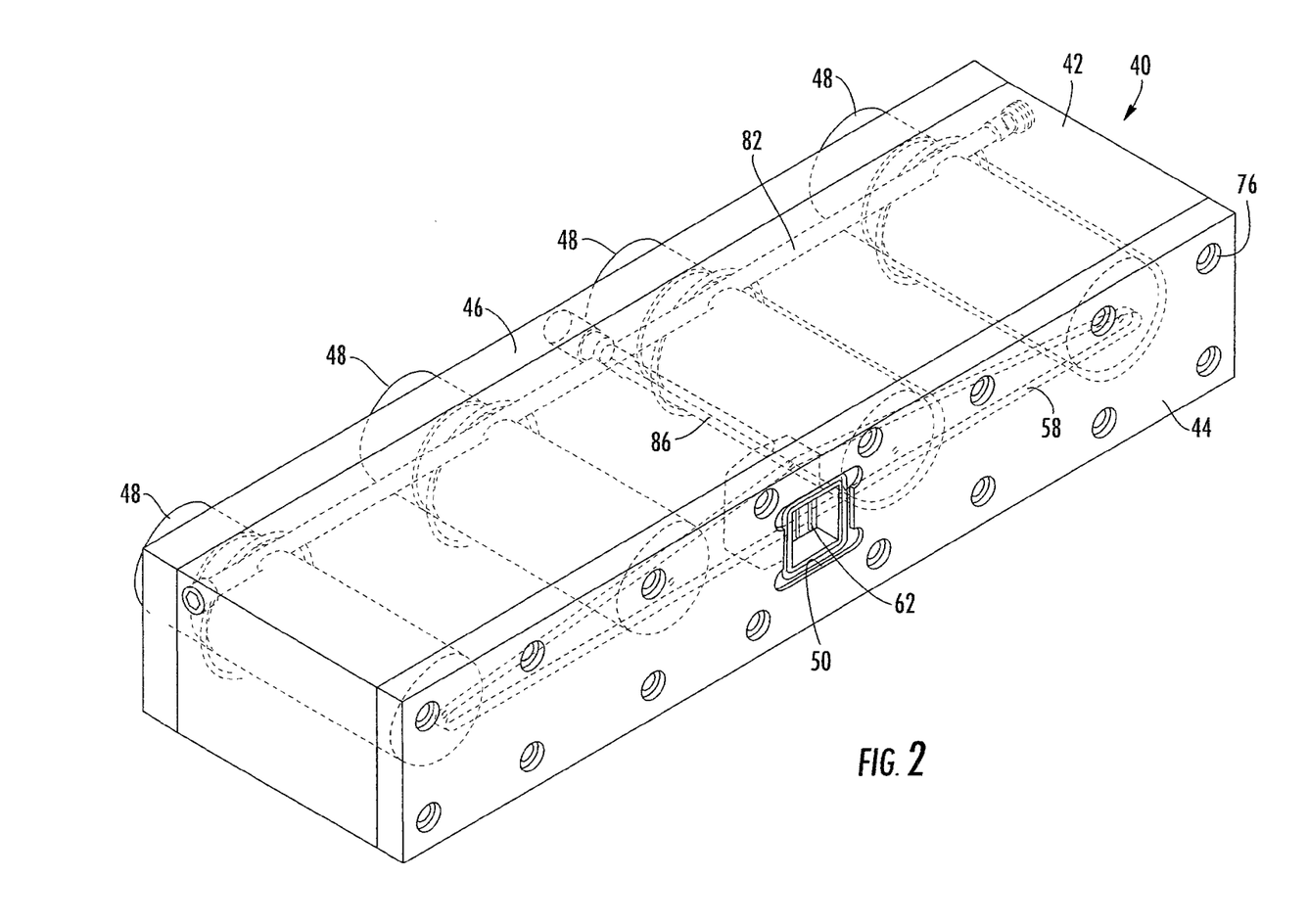
FIG. 2 is perspective view of a heat exchange manifold with the internal features shown in phantom for use in the solar energy collector system shown in FIG. 1.
Figure 3:
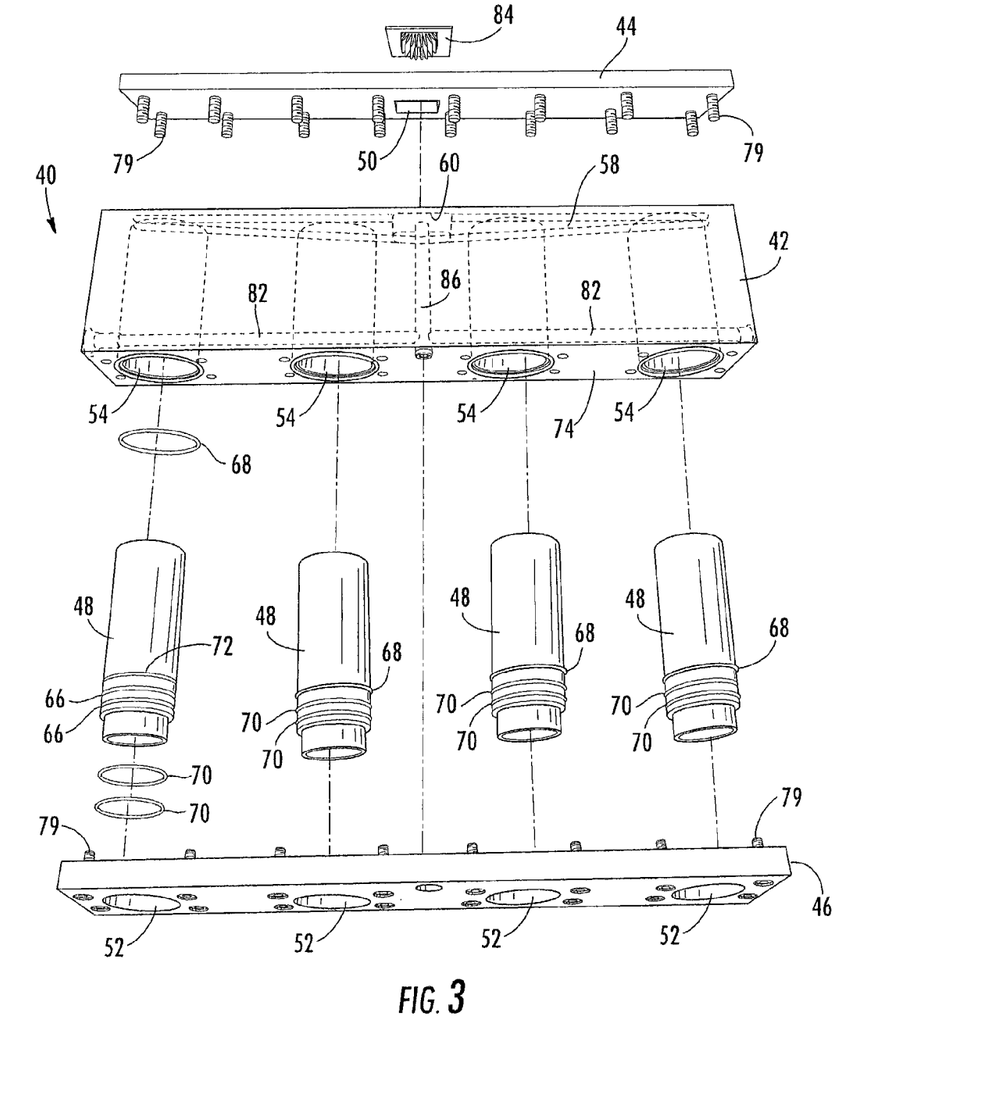
FIG. 3 is an exploded perspective view of the manifold shown in FIG. 2.

Referring now to FIGS. 2 and 3, the heat exchange housing 21 accommodates a manifold assembly 40 comprising a body 42, a top plate 44 and a bottom plate 46, and a plurality of receptacles 48 for receiving the pipe bulbs 30 on the ends of the heat pipes 26. The top plate 44 is a generally flat rectangular piece. The top plate defines a central opening 50 for receiving a heat sink 84. Similarly, the bottom plate 46 is a generally flat rectangular piece and defines circular openings 52 longitudinally spaced along the bottom plate 46.

Figure 4:
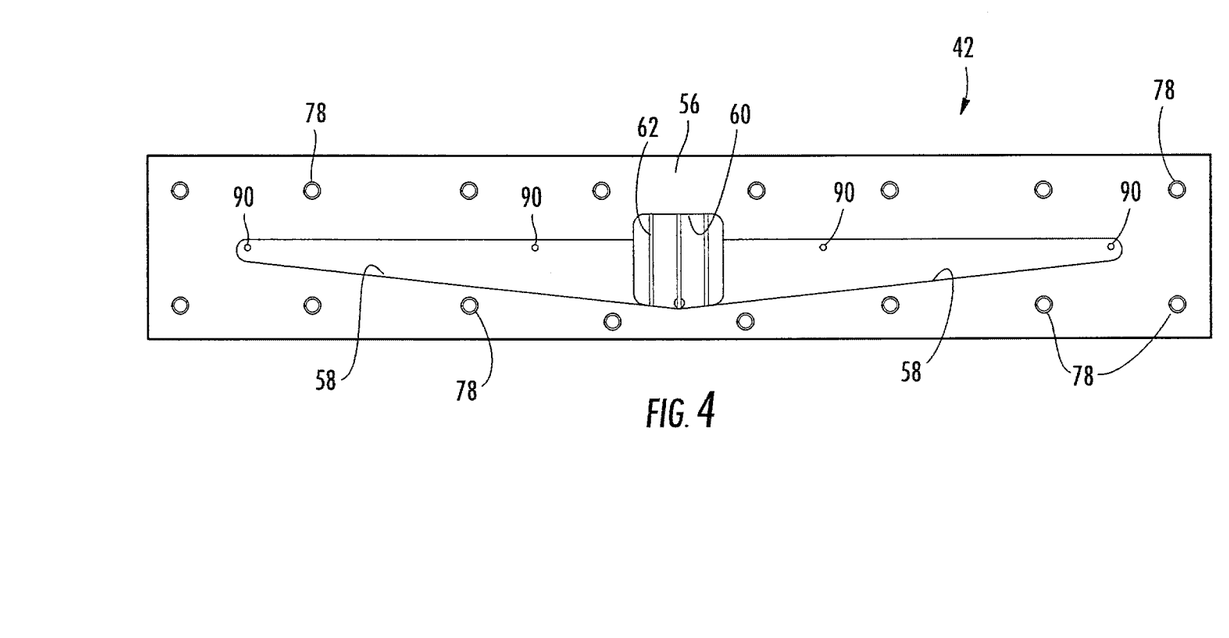
FIG. 4 is a top plan view of the body of the manifold shown in FIG. 3.

The body 42 of the manifold assembly 40 is a generally rectangular box. Longitudinally spaced blind cylindrical bores 54 are formed in the body 42, which function as receptacle cavities 80 for accommodating the receptacles 48. As shown in FIG. 4, the upper surface 56 of the body 42 has a V-shaped groove 58 formed therein. A four-sided condensation reservoir 60 is centrally located with respect to the groove 58. The condensation reservoir 60 extends further into body 42 than the V-shaped groove 58. Three spaced wicking elements 62 extend transversely across the upper surface 56 of the body 42 above the condensation reservoir 60 forming a mesh capillary wick.

The receptacles 48 comprise hollow substantially cylindrical copper sleeves open at one end. The receptacles 48 have three longitudinally-spaced circumferential grooves 64, 66 in the outer surface of the receptacle adjacent the open end. The upper groove 64 is configured to receive a retaining ring 68. The lower grooves 66 each receive an o-ring 70. The o-rings 70 may be made of rubber or suitable plastic material.

Figure 5:
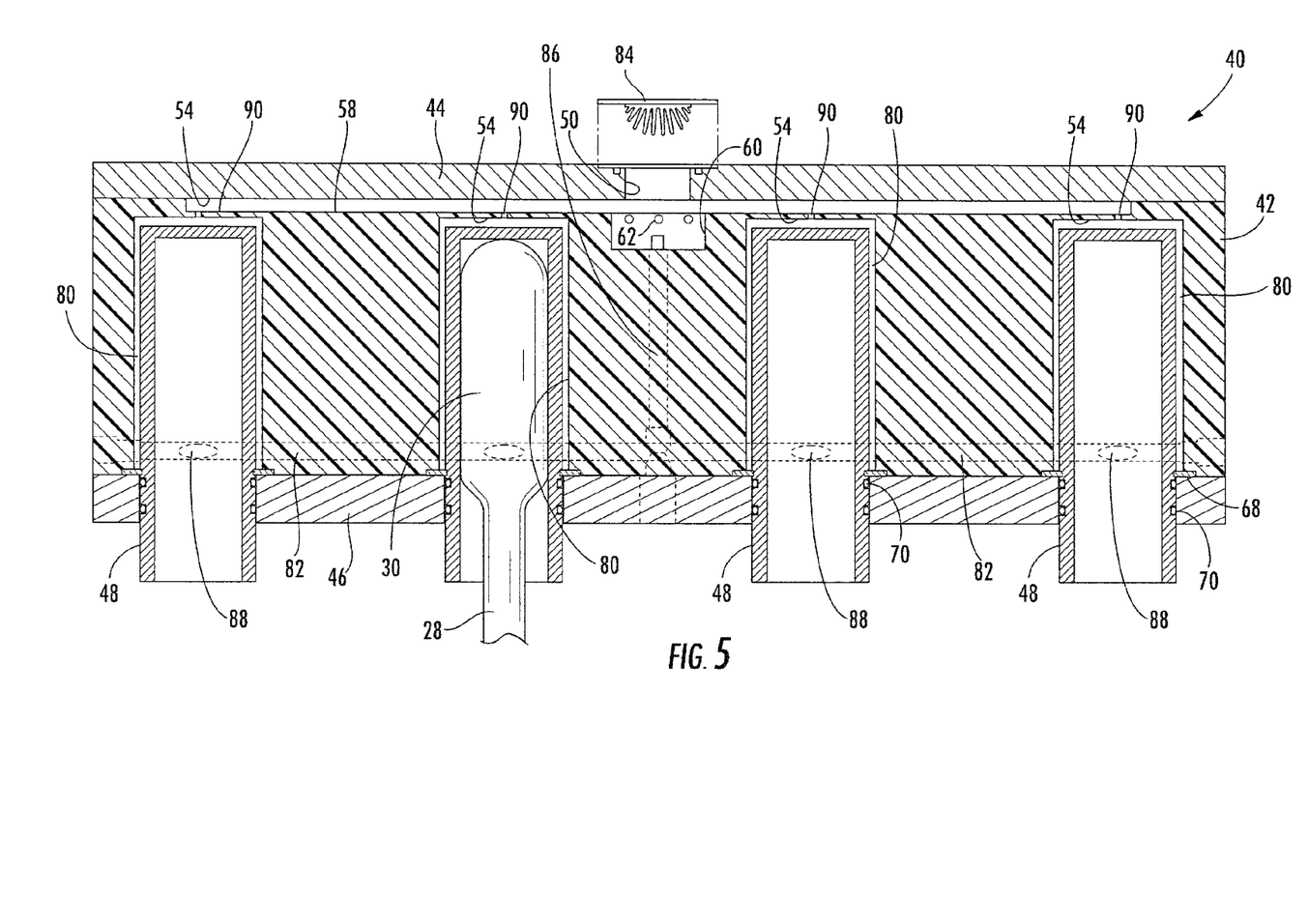
FIG. 5 is a longitudinal cross-section view of the manifold shown in FIG. 2.
Figure 6:
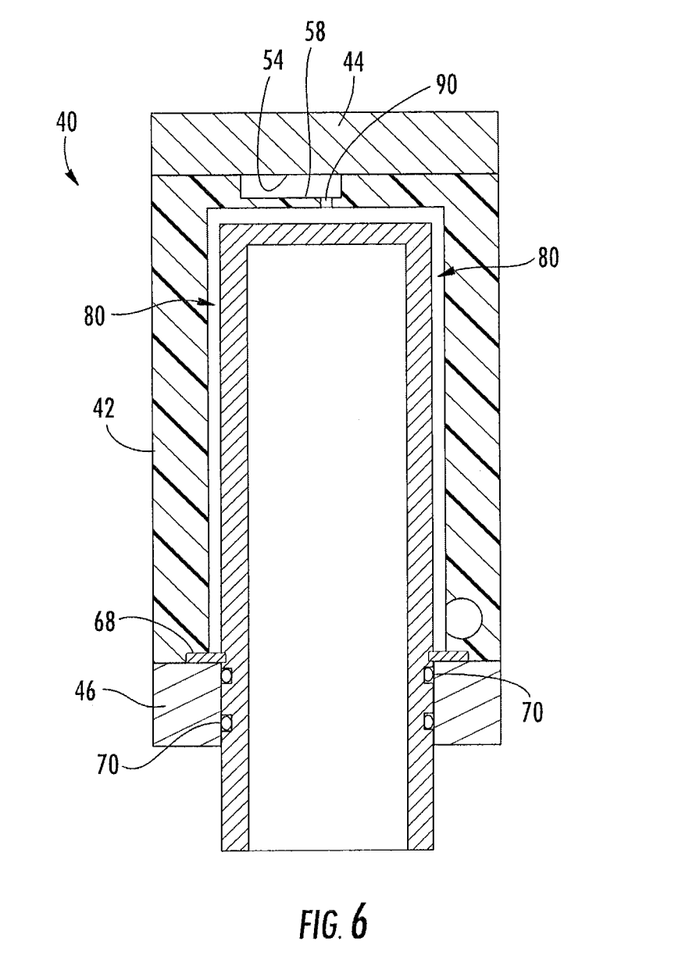
FIG. 6 is a transverse cross-section view of the manifold shown in FIG. 2.

To assemble the manifold 40, the receptacles 48 are disposed in the bores 54 of the body 42. Referring to FIGS. 5 and 6, the receptacles 48 are advanced into the bores 54 until the retaining rings 68 seat in a circular groove 72 formed in the bottom surface 74 of the body 42. The diameter of the receptacles 48 is slightly less than the diameter of the bores 54 such that receptacle cavities 80 are created between the inside surface of the bores 54 and the outside surface of the receptacles 48. The top plate 44 and bottom plate 46 are then secured to the body 42. Numerous openings 76 are disposed along the edges of the top plate 44 and bottom plate 46 for passing screws 79 which are threaded into corresponding openings 78 in the body 42. When assembled, the central opening 50 in the top plate 44 is in registry with the condensation reservoir 60 in the upper surface 56 of the body 42. The circular openings 52 in the bottom plate 46 are in registry with the receptacle cavities 54 in the body 42. As shown in FIGS. 5 and 6, the open ends of the receptacles 48 extend from the bottom plate 46. Securing the bottom plate 46 to the body 42 also fixes the retaining rings 68 and their associated receptacles 48 in the body 42. The o-rings 70 seal the outer surface of the receptacles 48 against the bottom plate 46 to prevent leakage of thermal transfer fluid.

Figure 7:
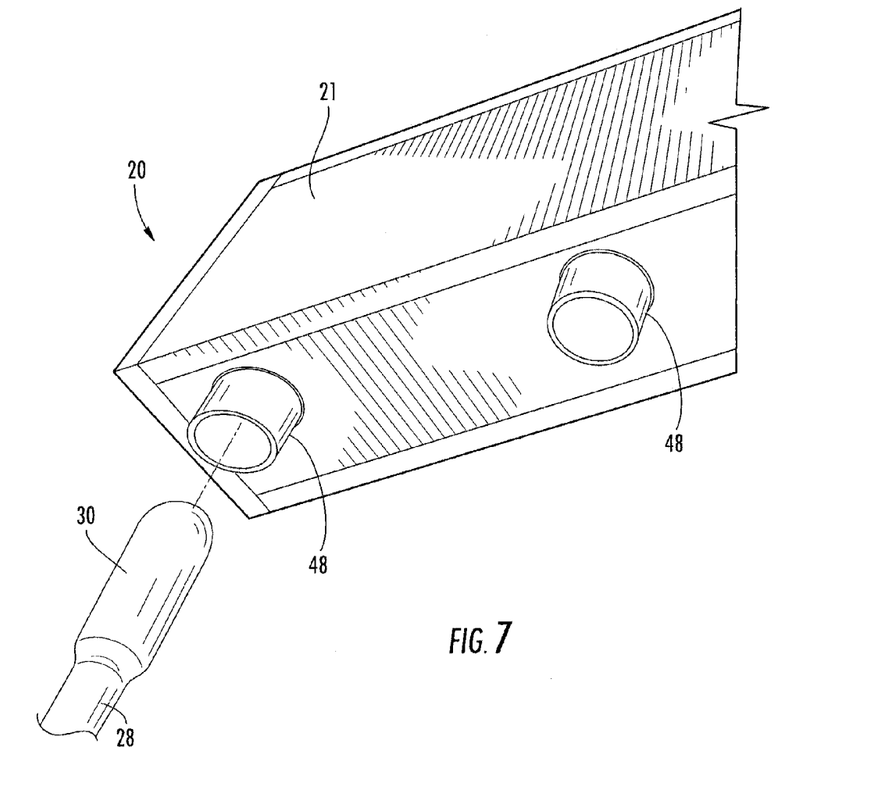
FIG. 7 is a partial exploded left side perspective view of the solar energy collector system shown in FIG. 1.
Figure 8:
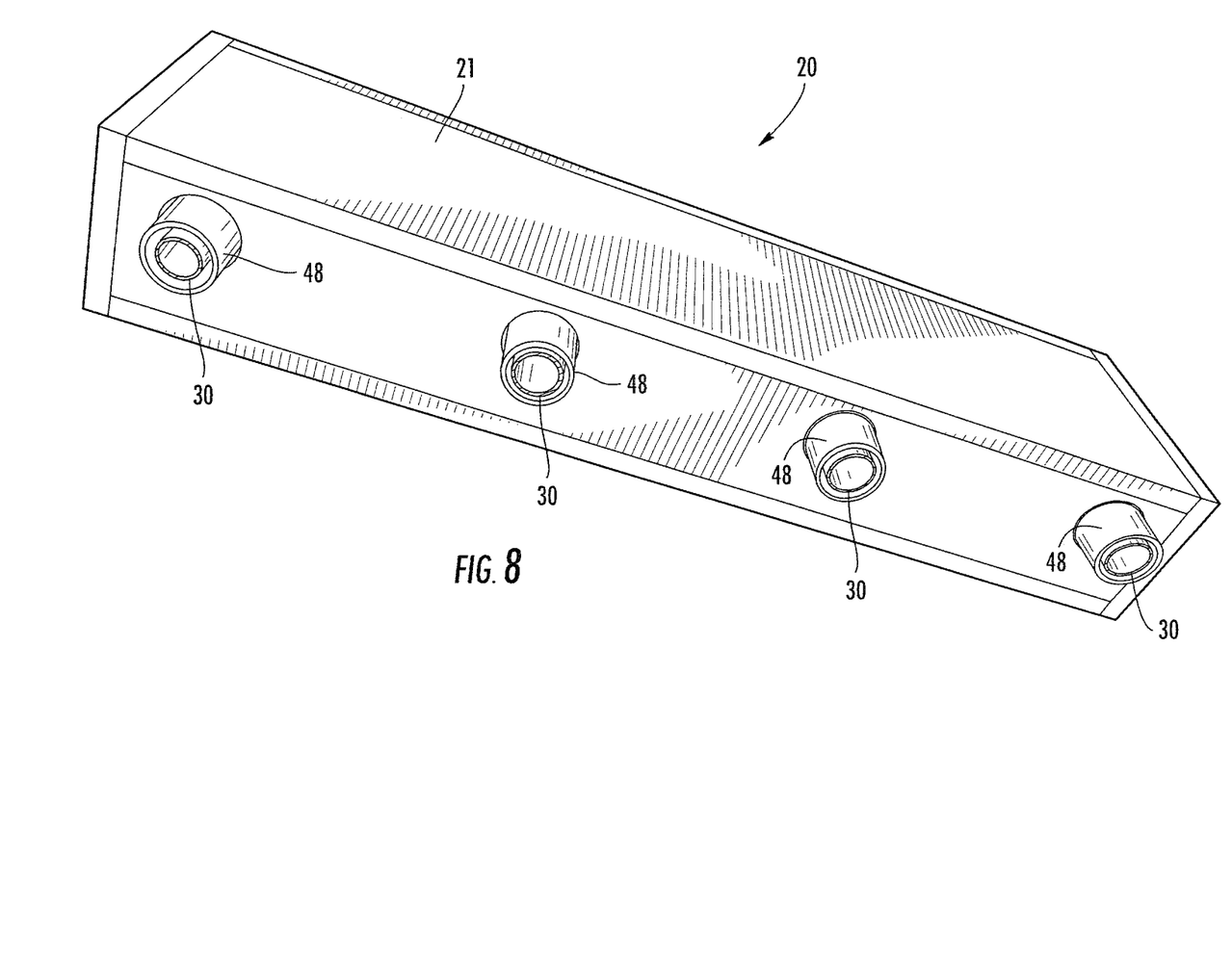
FIG. 8 is a bottom perspective cross-section view of the solar energy collector system shown in FIG. 1.

Referring to FIGS. 7 and 8, the receptacles 48 are sized to receive the bulbs 30 of the heat pipes 26. The receptacles 48 are sized so that the bulbs 30 fit in close contact with the receptacles 48 such that the bulbs 30 are held securely in the receptacles 48 of the manifold 40 at least partially by friction. It is understood that the pipe bulbs 30 can be secured in the receptacles 48 by any suitable means. For example, the receptacles 48 may have an internal thread and the pipe bulbs 30 may also be provided with a mating externally threaded portion (not shown). It is thus understood that other suitable techniques may be employed for holding the heat pipes 26 in contact at the bulbs 30 with the receptacles 48.

As best seen in FIGS. 2 and 5, the manifold 40 defines a fluid passage for circulating the flow of the thermal transfer fluid from the receptacle cavities 80 to the heat sink 84 and from the heat sink 84 back the receptacle cavities 80. The V-shaped groove 58 in the upper surface 56 of the body 42 of the manifold 40 functions as a vapor chamber in the fluid passage between the receptacle cavities 80 and the heat sink 84. A small central opening is provided at the top of each receptacle cavity 80 and opens into the vapor chamber 58 (FIG. 4). The fluid passage comprises a distribution passage 82 and a return path 86. The distribution passage 82 distributes the flow of the thermal transfer fluid to the receptacle cavities 80 and around the peripheral surface of the receptacles 48 for heat transfer from the bulbs 30 to the thermal transfer fluid. As shown by FIG. 6, the thermal transfer fluid flows into the receptacle cavities 80 via inlet openings 88 in the distribution passage 82. The return passage 86 extends between the condensation reservoir 60 and the distribution passage 82. As best seen in FIG. 4, the return path 86 opens into the condensation reservoir 60 at the base of the V-shaped groove 58.

An amount of thermal transfer fluid is placed in the fluid passage of the manifold 40 before it is sealed. It is understood that there are a number of thermal transfer fluids that can be used satisfactorily, including water, ammonia, methanol, ethanol, or other suitable volatile fluid, as well as commercially available heat transfer fluids. For low temperature uses, a fluid with a higher vapor pressure, such as methanol, is preferred, and for higher temperature uses water can be used.

Figure 10:
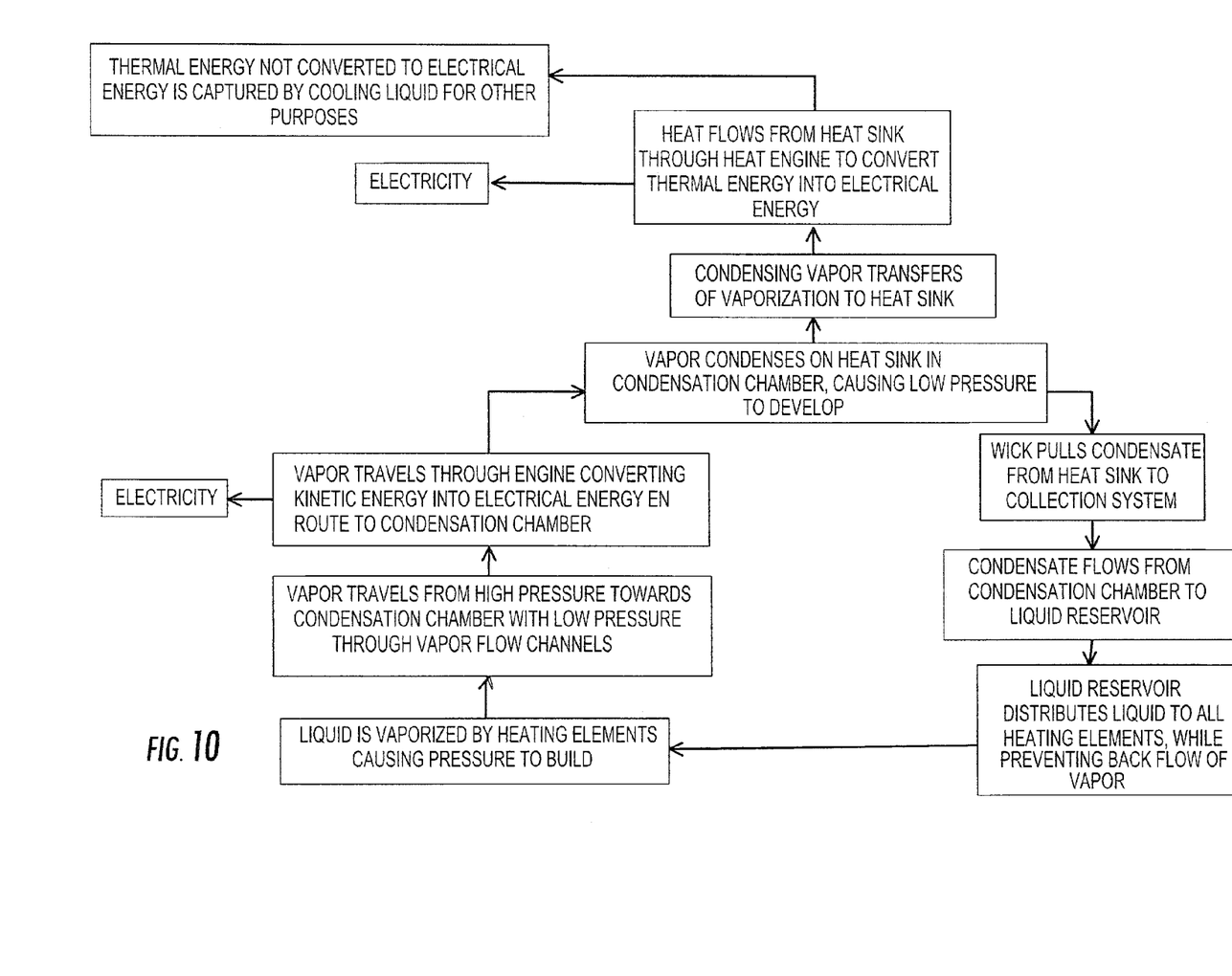
FIG. 10 is a process flow chart of an embodiment of a solar energy collector system.

Referring to FIG. 10, in use the solar collector system 20 is located on top of a house or other building for exposure to sunlight for collecting solar energy. As is known in the art, the collector system 20 is installed preferably in an oblique position, with the heat exchange housing 21 above the collector members 22 and in a generally horizontal position with respect to the ground. The solar collector members 22 are operatively connected with the housing 21 and extend downwardly from the housing such that the distal ends of the heat pipes 26 are in a position somewhat lower than the bulbs 30. Additionally, parabolic or focusing reflectors can be placed behind the solar collector members for concentrating solar radiation incident upon the collecting surface.

The outer surfaces of the collector members 22 define a solar energy collecting surface. As solar radiation impinges on the solar collector members 22, the solar energy, primarily in the form of light, is absorbed by the collecting surface and the heat generated is transferred to the working fluid within the heat pipes 26. The energy causes the working fluid in the heat pipes 26 to evaporate so that the vapors are driven to a lower pressure area in the bulb 30 at the upper end of the heat pipe 26. The bulbs 30 are inside the heat exchange housing 21 in a heat exchange relationship with the receptacles 48. As described above, the thermal transfer fluid is distributed to each receptacle cavity 80 through the inlet openings 88 in the distribution passage 82. The thermal transfer fluid in the receptacle cavities 80 provides a cooler environment around the pipe bulbs 30 and absorbs heat from the bulb 30. The receptacles 48 thus function as a bridge for transferring heat from the pipe bulbs 30 to the interior of the manifold 40, for heating the thermal transfer fluid in the receptacle cavities 80. As a result, the heat of the working fluid is exchanged, or given up, to the thermal transfer fluid via the receptacles 48. As the working fluid cools by such heat transfer, the working fluid becomes more dense and begins to flow downwardly toward the distal ends of the collector members 22 where it is again heated. The working fluid is thus circulated by evaporation and condensation action as is known in the art.

The heated receptacles 48 cause the thermal transfer fluid in the receptacle cavities 80 to vaporize. It is understood that several factors are considered in determining the heat transfer between the working fluid and the thermal transfer fluid. For example, physical parameters of the manifold 40, such as the relative diameter of the receptacles 48 and the receptacle cavities 80, the thickness of the wall of the receptacle 48 and the thermal conductivity of the material by which the heat absorbing components are made, all determine the heat transfer effectiveness and efficiency between the working fluid and the thermal transfer fluid within the fluid passage.

The thermal transfer fluid vapor exits the receptacle cavities 80 via openings 90 at the top of each of the receptacle cavities 80. The vapor enters the vapor chamber 58 and travels toward the condensation reservoir 60 where the heat sink 84 is located. Once the vaporized thermal transfer fluid reaches the heat sink 84, the thermal transfer fluid transfers its heat to the heat sink 84. The heat sink 84 then transfers heat to, for example, a heat engine, such as a Stirling engine or thermoelectric generator, which can convert thermal energy to electricity or other practical use.

As a result of heat transfer, the thermal transfer fluid vapor condenses into liquid form. The wick 62 enhances the capillary drive distribution of the thermal transfer fluid along the inside surface of the condensing portion of the heat sink 84. Conventional mesh or grooved wicks are suitable for efficient capillary drive of the thermal transfer fluid. The wick 62 expedites the flow of condensate away from the surfaces of the heat sink 84 to allow for continual rapid condensation. The condensed thermal transfer fluid is directed into the condensation reservoir 60 and down the return passage 86 located below the heat sink 84. The return passage 86 feeds the thermal transfer fluid into the distribution passage 82 for distribution to the receptacle cavities 80. In this manner, the solar collector system 20 facilitates the continuous cycle of vaporization in the receptacle cavities 80 and condensation at the heat sink 84.

Figure 9:
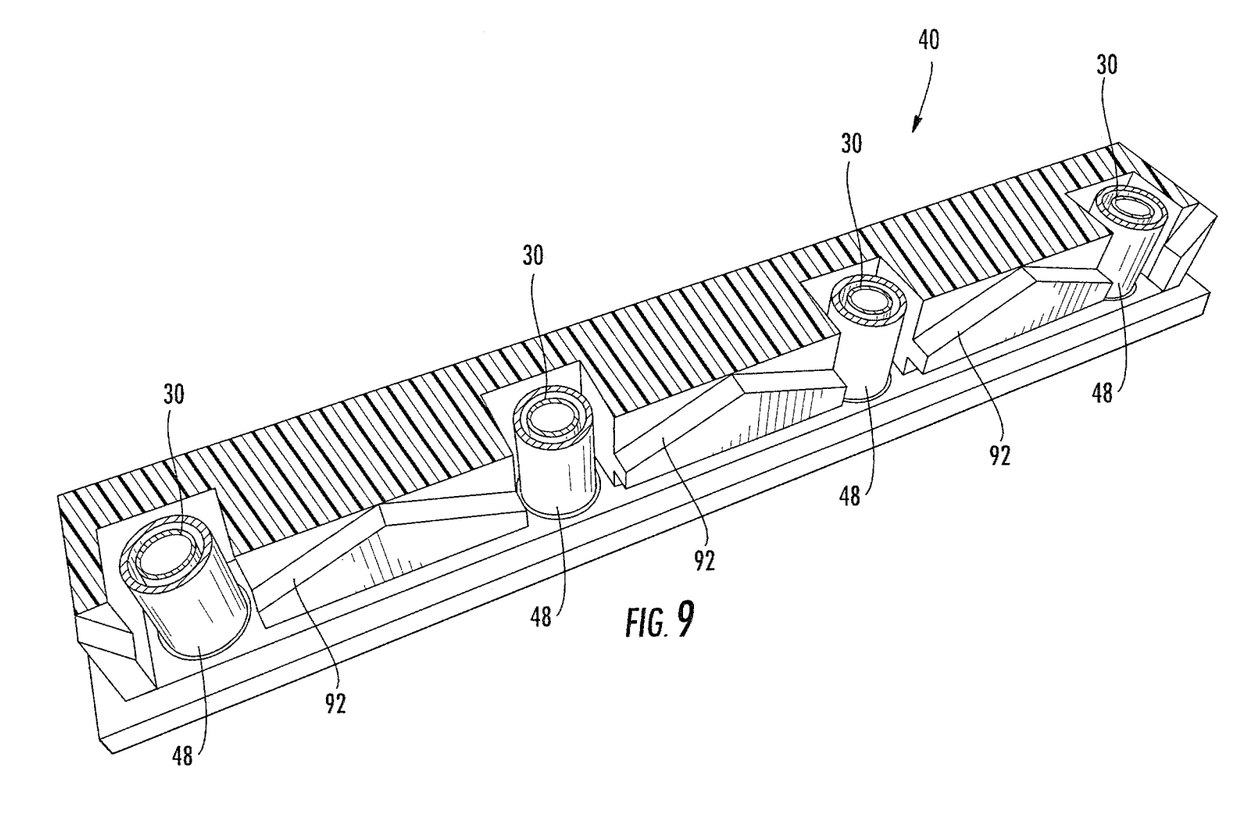
FIG. 9 is a top perspective cross-section view of another embodiment of a manifold for use in the solar energy collector system shown in FIG. 1.

Another embodiment of the manifold 40 is shown in FIG. 9 and comprises a condensate collection system including a plurality of baffles 92 configured in the body 42. The collection system gathers the condensed thermal transfer fluid by gravity into a common liquid reservoir located below the heat sink 84 and surrounding and shared by all of the receptacle cavities 80. The receptacle cavities 80 are linked together to allow vapor to flow from the receptacle cavities to a central condenser cavity housing the heat sink 84. The condenser cavity collects condensation from the heat sink and directs the fluid via the condensate collecting system to the liquid reservoir common to the receptacle cavities 80 where the working fluid can again be heated and turned to vapor. The linkage between the receptacle cavities include the baffles 92, which are shaped in a manner to allow condensate to drain to the receptacle cavities.

The solar collector system 20 as described herein may be fabricated in modular sections and, subsequently, a plurality of modules may be interconnected in series (not shown). Each receptacle 48, or series of receptacles, is modular and can be linked in series with other receptacles 48 to enlarge the overall size of the manifold 40 and the number of modular receptacle units feeding a central vapor cavity. This modularity also allows for ease of logistics in shipping several modules that can be assembled into a lengthy manifold at the deployment site as opposed to shipping a single lengthy non-modular manifold.

The solar collector system 20 described herein is an efficient means for transferring absorbed heat, with minimal loss, to a thermal transfer fluid medium circulating in a manifold. The system provides the advantage of making available a large number of solar energy collector members 22 in parallel to transfer heat to effect the thermal transfer fluid vaporizing-condensing cycle. This arrangement provides for a concentration of heat energy from the collector members to a single point using a closed condensation and evaporation cycle of a heated liquid, allowing for the conversion of heat energy to electricity or other practical use.

An additional advantage of the system is unidirectional flow of vapor within the closed vaporizing-condensing cycle. This unidirectional flow provides the benefit of allowing for the conversion of kinetic energy into electrical energy through such means, for example, as a microturbine (FIG. 10). Unidirectional vapor flow is created by designing the condensate collection system in such a way as to allow the thermal transfer fluid to act as a barrier in preventing vapor from flowing in the opposite direction of the intended closed cycle. This barrier is created by both the surface tension of the thermal transfer fluid and the hydrostatic pressure of the condensation reservoir to the return passage.

The solar collector system 20 also enables the passive allocation of thermal energy available for conversion to electrical energy based on seasonal variation in sunlight intensity. The manifold allows the user to take advantage of both the efficient operation of heat engines at higher temperature differentials and the inefficient operation of heat engines at lower temperature differentials. The rate of heat energy accumulation in the manifold represented as the ratio between rate of heat loss through the heat engine and rate of heat production from the array of insulated heat pipes will enable passive control in utilizing excess heat production during the summer to generate electricity. Given a certain climate and expected heat demand by dwelling occupants, a target maximal heat production can be used to calculate the number of insulated heat pipes necessary to meet heating demand during the winter. Once the rate of heat production is fixed through the target heat production, the size of the cross-sectional area will be scaled to control the rate at which heat energy is accumulated in the manifold to create a temperature differential needed to drive a heat engine. Given that solar insulation intensity at any given time of the day is roughly twice as intense during the high summer than the low winter, greater temperature differentials will be created in the summer to effectively fuel a heat engine and produce some captured thermal energy (FIG. 10), while lower temperature differentials will be created in the winter to mainly capture thermal energy and generate little fuel for a heat engine.

An important passive control component of the manifold is the heat sink. The heat sink is designed in such a way as to facilitate rapid condensation by maximizing the surface area and shedding of condensation. The ability of the heat sink to rapidly condense vapor facilitates the ability of the manifold to create a high temperature differential to fuel a heat engine. The rapid condensation functionality of the manifold is enhanced through the implementation of various methods to the heat sink, for example, various coatings, anodizing, wicks, and the like.

The continual closed loop cycle of evaporation-condensation of the thermal transfer fluid is expedited by lowering the internal pressure of the manifold and by removing other unintended fluids from the manifold. Lowering the internal pressure and removing contaminating fluids from the manifold, such as through vacuum sealing, allows the thermal transfer fluid to vaporize at a lower temperature; thus lowering the energy barrier to quickly start the closed loop cycle. Additionally, the thermal transfer fluid is purged of contaminating fluids, such as air, through processes, such as sonication, boiling, and freezing. The process of filling the manifold with thermal transfer fluid can be done by vacuum sealing purified, frozen thermal transfer fluid in an environment with cold ambient temperatures.

Although the solar collector system and method has been shown and described in considerable detail with respect to only a few exemplary embodiments thereof, it should be understood by those skilled in the art that I do not intend to limit the invention to the embodiments since various modifications, omissions and additions may be made to the disclosed embodiments without materially departing from the novel teachings and advantages of the invention, particularly in light of the foregoing teachings. For example, a fluid inlet may be adapted for connecting with a fluid source and a fluid outlet may be connected to the manifold for conducting the thermal transfer fluid from the source and out of the manifold. The heated thermal transfer fluid flowing from the outlet can be used for conventional heating applications or other uses. Accordingly, I intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A system for collecting solar energy, the solar energy collecting system comprising: a manifold defining a closed fluid passage between a condensation point and a plurality of holes into a housing, the holes opening into the fluid passage, the manifold including a plurality of receptacles configured to be received in the holes in the housing such that the receptacles extend into the housing in heat exchange relationship with the fluid passage at heating points defined by an outside surface of the receptacles, and a heat sink at the condensation point; a fluid within the fluid passage; and a solar energy collecting device, including a plurality of solar energy collector members extending from and operably connected to the receptacles in the manifold, the plurality of solar energy collector members adapted to collect solar energy and transform said solar energy into heat energy, wherein the heat energy is transferred from the solar energy collector members to the receptacles and to the fluid in a liquid state in the manifold at the heating points so as to heat the fluid into a vapor state such that the fluid in the vapor state flows to the condensation point where heat energy is transferred to the heat sink so as to cool the fluid to the liquid state, and wherein the fluid repeatedly circulates in the fluid passage between a vapor state at the heating points and a liquid state at the condensation point of the fluid passage.

2. A solar energy collecting system as recited in claim 1, wherein the closed fluid passage is a continuous loop having a first portion for directing fluid from the heating points to the condensation point, and having a second portion for directing fluid from the condensation point to the heating points.

3. A solar energy collecting system as recited in claim 1, wherein the receptacles are formed from copper.

4. A solar energy collecting system as recited in claim 1, wherein the closed fluid passage has a condensation reservoir adjacent the heat sink for collecting fluid cooled to the liquid state.

5. A solar energy collecting system as recited in claim 1, further comprising a heat engine operably connected to the heat sink.

6. A solar energy collecting apparatus as recited in claim 1, wherein the manifold defines a liquid reservoir as a portion of the closed fluid passage, the reservoir accommodating the heating points.

7. A system for collecting solar energy, the solar energy collecting system comprising:
    a manifold defining a closed fluid passage between a condensation point and a plurality of openings into the fluid passage, the manifold including
        a plurality of receptacles configured to be received in the openings in heat exchange relationship with the fluid passage at heating points defined by an outside surface of the receptacles, and
        a heat sink at the condensation point;
    a fluid within the fluid passage, wherein the closed fluid passage is a continuous loop having a first portion for directing fluid from the heating points to the condensation point, and having a second portion for directing fluid from the condensation point to the heating points; and
    a solar energy collecting device, including a plurality of solar energy collector members extending from and operably connected to the receptacles in the manifold, the plurality of solar energy collector members adapted to collect solar energy and transform said solar energy into heat energy,
wherein the heat energy is transferred from the solar energy collector members to the receptacles and to the fluid in a liquid state in the manifold at the heating points so as to heat the fluid into a vapor state such that the fluid in the vapor state flows to the condensation point where heat energy is transferred to the heat sink so as to cool the fluid to the liquid state, and wherein the fluid repeatedly circulates in the fluid passage between a vapor state at the heating points and a liquid state at the condensation point of the fluid passage, and wherein the manifold defining the second portion of the fluid passage comprises a plurality of baffles for directing fluid in the liquid state to the heating points.

8. A system for collecting solar energy, the solar energy collecting system comprising:
    a manifold defining a closed fluid passage between a condensation point and a plurality of heating points, the manifold including a plurality of heat exchange members configured to be in heat exchange relationship with the fluid passage at the heating points, and a heat sink at the condensation point;

a fluid within the fluid passage;

a solar energy collecting device, including a plurality of solar energy collector members extending from and operably connected to the heat exchange members of the manifold, the plurality of solar energy collector members adapted to collect solar energy and transform said solar energy into heat energy; and a wick operatively associated with the condensation point for facilitating removal of fluid cooled to the liquid state from the condensation point, wherein the heat energy is transferred from the solar energy collector members to the heat exchange members and to the fluid in a liquid state in the manifold at the heating points so as to heat the fluid into a vapor state such that the fluid in the vapor state flows to the condensation point where heat energy is transferred to the heat sink so as to cool the fluid to the liquid state, and wherein the fluid repeatedly circulates between a vapor state at the heat exchange members and a liquid state at the condensation point of the fluid passage.

9. A method for collecting heat energy, the heat energy collecting method comprising the steps of: providing a housing defining a liquid reservoir, a closed fluid passage, and a plurality of holes into the housing, the holes opening into the fluid passage; providing a plurality of receptacles configured to be received in the holes in the housing such that the receptacles extend into the housing in heat exchange relationship with the fluid passage at heating points defined by an outside surface of the receptacles; providing a heat sink at a condensation point; delivering heat energy to the receptacles and to the fluid at the heating points for heating the fluid in the liquid reservoir into a vapor state such that the fluid in the vapor state flows from the liquid reservoir to the condensation point; transferring heat energy from the fluid in the vapor state to the heat sink for cooling the fluid to the liquid state; directing fluid in the liquid state from the condensation point to the liquid reservoir; and continuously circulating the fluid in the passage between the vapor state at the heating points and a liquid state at the condensation point.

10. A heat energy collecting method as recited in claim 9, wherein the step of delivering heat energy to the heating points comprises providing a plurality of solar energy collecting members adapted to collect solar energy and transform the solar energy into heat energy, and operably connecting each solar energy collecting member in a heat transfer relationship to one of the plurality of receptacles.

11. A heat energy collecting method as recited in claim 9, further comprising the step of converting the kinetic energy of the fluid moving through the fluid passage to electrical energy.

12. A heat energy collecting method as recited in claim 9, further comprising the step of expediting the removal of fluid in the liquid state from the heat sink at the condensation point.

13. An apparatus for use in collecting and concentrating heat energy from a plurality of heat energy collecting devices, the energy collecting and concentrating apparatus comprising:

a housing defining a liquid reservoir and a closed fluid passage between a condensation point and a plurality of holes into the housing, the holes opening into the liquid reservoir, the housing including a plurality of receptacles configured to be received in the holes in the housing such that the receptacles extend into the housing in heat exchange relationship with the liquid reservoir at heating points defined by an outside surface of the receptacles, and a heat sink at the condensation point;

a fluid within the fluid passage; and means adapted for delivering heat energy from the heat energy collecting device to the receptacles, wherein the heat energy is transferred to the receptacles and to the fluid in a liquid state at the heating points so as to heat the fluid into a vapor state such that the fluid in the vapor state flows from the liquid reservoir to the condensation point where heat energy is transferred to the heat sink so as to cool the fluid to the liquid state, and the fluid in the liquid state flows from the condensation point to the liquid reservoir, and wherein the fluid repeatedly circulates between a vapor state at the heating points and a liquid state at the condensation point.

14. An energy collecting and concentrating apparatus as recited in claim 13, wherein the closed fluid passage is a continuous loop having a first portion for directing fluid from the heating points to the condensation point, and having a second portion directing fluid from the condensation point to the heating points.

15. An energy collecting and concentrating apparatus as recited in claim 13, wherein the receptacles are formed from copper.

16. An energy collecting and concentrating apparatus as recited in claim 13, wherein the closed fluid passage has a condensation reservoir adjacent the heat sink for collecting fluid cooled to the liquid state.

17. An energy collecting and concentrating apparatus as recited in claim 13, wherein the heat energy delivering means comprises a plurality of solar energy collecting members adapted to collect solar energy and transform the solar energy into heat energy, each solar energy collecting member being operably associated in a heat transfer relationship with a one of the plurality of receptacles.

18. An energy collecting and concentrating apparatus as recited in claim 13, further comprising a heat engine operably connected to the heat sink.

19. An apparatus for use in collecting and concentrating heat energy from a plurality of heat energy collecting devices, the energy collecting and concentrating apparatus comprising:

a housing defining a liquid reservoir and a closed fluid passage between a condensation point and a plurality of openings into the liquid reservoir, the housing including a plurality of receptacles configured to be received in the openings in heat exchange relationship with the liquid reservoir at heating points defined by an outside surface of the receptacles, and a heat sink at the condensation point;

a fluid within the fluid passage, wherein the closed fluid passage is a continuous loop having a first portion for directing fluid from the heating points to the condensation point, and having a second portion directing fluid from the condensation point to the heating points; and means adapted for delivering heat energy from the heat energy collecting device to the receptacles, wherein the heat energy is transferred to the receptacles and to the fluid in a liquid state at the heating points so as to heat the fluid into a vapor state such that the fluid in the vapor state flows from the liquid reservoir to the condensation point where heat energy is transferred to the heat sink so as to cool the fluid to the liquid state, and the fluid in the liquid state flows from the condensation point to the liquid reservoir, and wherein the fluid repeatedly circulates between a vapor state at the heating points and a liquid state at the condensation point, and
wherein the housing defining the second portion of the fluid passage comprises a plurality of baffles for directing fluid in the liquid state to the heating points.

20. An apparatus for use in collecting and concentrating heat energy from a plurality of heat energy collecting devices, the energy collecting and concentrating apparatus comprising:
- a housing defining a closed fluid passage between a condensation point and a plurality of heating points, the housing including a plurality of heat exchange members configured to be in heat exchange relationship with the fluid passage at the heating points, and a heat sink at the condensation point;
- a fluid within the fluid passage;
- means adapted for delivering heat energy from the heat energy collecting device to the heat exchange members; and
- a wick operatively associated with the condensation point for facilitating removal of fluid cooled to the liquid state from the condensation point, wherein the heat energy is transferred to the heat exchange members and to the fluid in a liquid state at the heating points so as to heat the fluid into a vapor state such that the fluid in the vapor state flows to the condensation point where heat energy is transferred to the heat sink so as to cool the fluid to the liquid state, and wherein the fluid repeatedly circulates between a vapor state at the heat exchange members and a liquid state at the condensation point.

* * * * *

UNITED STATES PATENT AND TRADEMARK OFFICE
CERTIFICATE OF CORRECTION

| | | |
|---|---|---|
| PATENT NO. | : 8,967,136 B2 | Page 1 of 1 |
| APPLICATION NO. | : 12/904714 | |
| DATED | : March 3, 2015 | |
| INVENTOR(S) | : Jeffrey Lee | |

It is certified that error appears in the above-identified patent and that said Letters Patent is hereby corrected as shown below:

In the claims:

In column 10, claim 17, please change line 36 to:

operably associated in a heat transfer relationship with one

Signed and Sealed this
Fourteenth Day of July, 2015

Michelle K. Lee
*Director of the United States Patent and Trademark Office*